(12) United States Patent
Wilson

(10) Patent No.: US 7,207,802 B2
(45) Date of Patent: Apr. 24, 2007

(54) GLOBES HAVING MARKED ZONES OF GEOGRAPHIC INTEREST

(76) Inventor: Keith P. Wilson, 760 Fairmount Ave., St. Paul, MN (US) 55105

( * ) Notice: Subject to any disclaimer, the term of this patent is extended or adjusted under 35 U.S.C. 154(b) by 322 days.

(21) Appl. No.: 10/985,185

(22) Filed: Nov. 9, 2004

(65) Prior Publication Data
US 2006/0073442 A1   Apr. 6, 2006

Related U.S. Application Data

(60) Provisional application No. 60/605,045, filed on Aug. 27, 2004.

(51) Int. Cl.
*G09B 27/08* (2006.01)
(52) U.S. Cl. ..................... 434/131; 434/141
(58) Field of Classification Search ............... 434/130, 434/131, 132, 133, 135, 141, 142, 143, 144, 434/149
See application file for complete search history.

(56) References Cited

U.S. PATENT DOCUMENTS 1,836,423 A * 12/1931 Wright ..................... 434/142
2,099,518 A * 11/1937 Hazlett ..................... 368/24
2,102,413 A * 12/1937 Hall ......................... 434/143
2,939,225 A    6/1960 Mapes et al. ................ 35/46
3,133,359 A *  5/1964 Kuriyama .................. 434/131
4,761,138 A *  8/1988 Niesyn ..................... 434/143

OTHER PUBLICATIONS

U.S. Appl. No. 10/985,190, filed Nov. 9, 2004, entitled "Earth Globe Assembly" (19 pages).

* cited by examiner

*Primary Examiner*—Kurt Fernstrom
(74) *Attorney, Agent, or Firm*—Kagan Binder, PLLC

(57) ABSTRACT

An Earth globe is provided for studying continental position theories. The globe comprises graphical image representations of a plurality of land masses at locations representing the current position of the land masses on Earth. A plurality of at least a portion of great circle indication lines are graphically marked on the globe that generally correspond to linear portions of geographic features on the globe. Globes having at least one graphically marked intersection zone corresponding to an area within about 5° of defined geographic points are also provided. Methods for marking globes are also described.

8 Claims, 5 Drawing Sheets

GLOBES HAVING MARKED ZONES OF GEOGRAPHIC INTEREST

PRIORITY CLAIM

This Non-provisional Patent Application claims priority from U.S. Provisional Patent Application having Ser. No. 60/605,045, filed on Aug. 27, 2004, and titled GLOBES HAVING MARKED ZONES OF GEOGRAPHIC INTEREST, wherein the entire contents of said provisional application is incorporated herein by reference.

FIELD OF THE INVENTION

The present invention relates to globes of the Earth. More specifically, the present invention relates to Earth globes having markings that identify zones of geographic interest.

BACKGROUND OF THE INVENTION

In examining a globe of the world, one can casually observe that it appears that the continents appear to "fit together" like pieces of a puzzle. This has lead to a number of theories in the development of the Earth with the geography as it appears today. In 1912, Alfred L. Wegener proposed a hypothesis of continental drift, suggesting that the Earth's continents had at one time been joined. In Wegener's hypothesis, one large continent existed that broke apart and land masses drifted through the ocean floor to where they are now located. Wegener was not the first to suggest that the continents had once been connected, but he was the first to present extensive evidence from several fields, including fossil evidence in support of his theories.

One model of continent formation and location is described in the theory of Plate Tectonics. This theory suggests that the surface of the Earth is composed of a number of plates which fit together like pieces of a spherical puzzle that are moving with respect to each other. The plate-tectonic model assumes a constant-sized Earth, and therefore postulates that sea-floor spreading that occurs at ridges in the Earth is compensated for by subduction and collisional compression.

In addition to Wegener and others' theories regarding continental movement, additional scientific camps have formed. One such group, called "Fixists," believed that the continents and basins were essentially unchanged in their position and relative configuration. Another group, called "Contractionists," believed that the solid Earth has gradually contracted over time, causing portions of the ocean floor to become dry land, and portions of dry land in turn to become ocean floor.

Another current theory, called the "expanding Earth" hypothesis, suggests that the shifting of the continents can be explained by a large increase in size of the Earth since its formation. As a spherical object expands radially, any object on its surface maintains its position and does not move horizontally on the surface. This can be envisioned by partially inflating a balloon, marking two points on the balloon, and more fully inflating the balloon. Inflating and deflating the balloon graphically illustrates how pieces of a once unitary land mass could separate. This expanding earth theory also has challenges, including questions regarding location and creation of mountains, and so forth.

A number of scientific developments have generated increased interest in various continent formation and location theories. Increased study of the ocean floor has demonstrated that the ocean floor is surprisingly rugged and contains material that is young relative to other areas of the Earth. This has further increased discussion of seafloor-spreading hypotheses, and theories regarding recycling of oceanic crust material. Studies of the patterns of the world's Earthquake and volcanic activity have revealed that such activity appears to be concentrated along oceanic trenches and submarine mountain ranges. Additionally, it appears that there have been repeated reversals of the Earth magnetic field over time. Specifically, stripes of magnetically different rock having alternating polarity have been located in rows on either side of the mid-ocean ridge. This phenomenon is suggested to be caused by the presence of grains of magnetite in the rock. The magnetite components of the rock behave like small magnets, and are aligned with the orientation of the Earth's magnetic field when the rock is in the magma phase. When the magma cools to form solid volcanic rock, the polarity of that portion of the rock is locked in, recording the Earth's magnetic orientation or polarity at the time of cooling. The oceanic crust therefore provides a record of the history of the reversals in the Earth's magnetic field, and therefore also the ages of different portions of the ocean floor.

Analysis tools to study the relationship of continents and other land masses on the Earth are always in demand to better help the scientific community recognize unique features that provide clues for solving the questions raised regarding continent formation and location.

SUMMARY OF THE INVENTION

The present invention relates to an Earth globe for studying continental position theories, and methods of marking the globe to facilitate in the study of the relationship of continents and other land masses on the Earth. The Earth globe comprises graphical image representations of a plurality of land masses at locations representing the current position of the land masses on Earth and a plurality of at least a portion of great circle indication lines graphically marked on the globe generally corresponding to a linear portions of geographical features, such as a land mass coast, a land mass shelf, an island chain, or a mountain chain. By study of globes that are so marked, one can formulate theories of possible historical motion of land masses on Earth, and additionally acquire a greater appreciation for the relative positional relationship of land masses.

In a surprising aspect of the present invention, it has been discovered that in the study of great circle lines corresponding to linear portions of geographical features, a number of the great circle lines actually intersect at a small number of significant intersection zones. Identification and consideration of these intersection zones is useful in adding to the geographic knowledge base, and additionally in assisting in the total understanding of the relationships of the worlds land masses. In a particularly preferred embodiment of the present invention, one or more intersection zones are identified on the globe that correspond to areas within about 5° of a geographic point having latitude and longitude values selected from the group consisting of 43° south latitude and 13° west longitude; 43° north latitude and 167° east longitude; 63° north latitude and 55° west longitude; 62° south latitude and 124° east longitude; 23.5° south latitude and 63° west longitude; and 23.5° north latitude and 120° east longitude.

One or more of these significant intersection zones are, in one embodiment, identified on the globe by graphically marked great circle indication lines at the intersection thereof. Alternatively, one or more intersection zones themselves may be graphically marked without providing graphically marked great circle lines.

DETAILED DESCRIPTION OF PRESENTLY PREFERRED EMBODIMENTS

Figure 1:
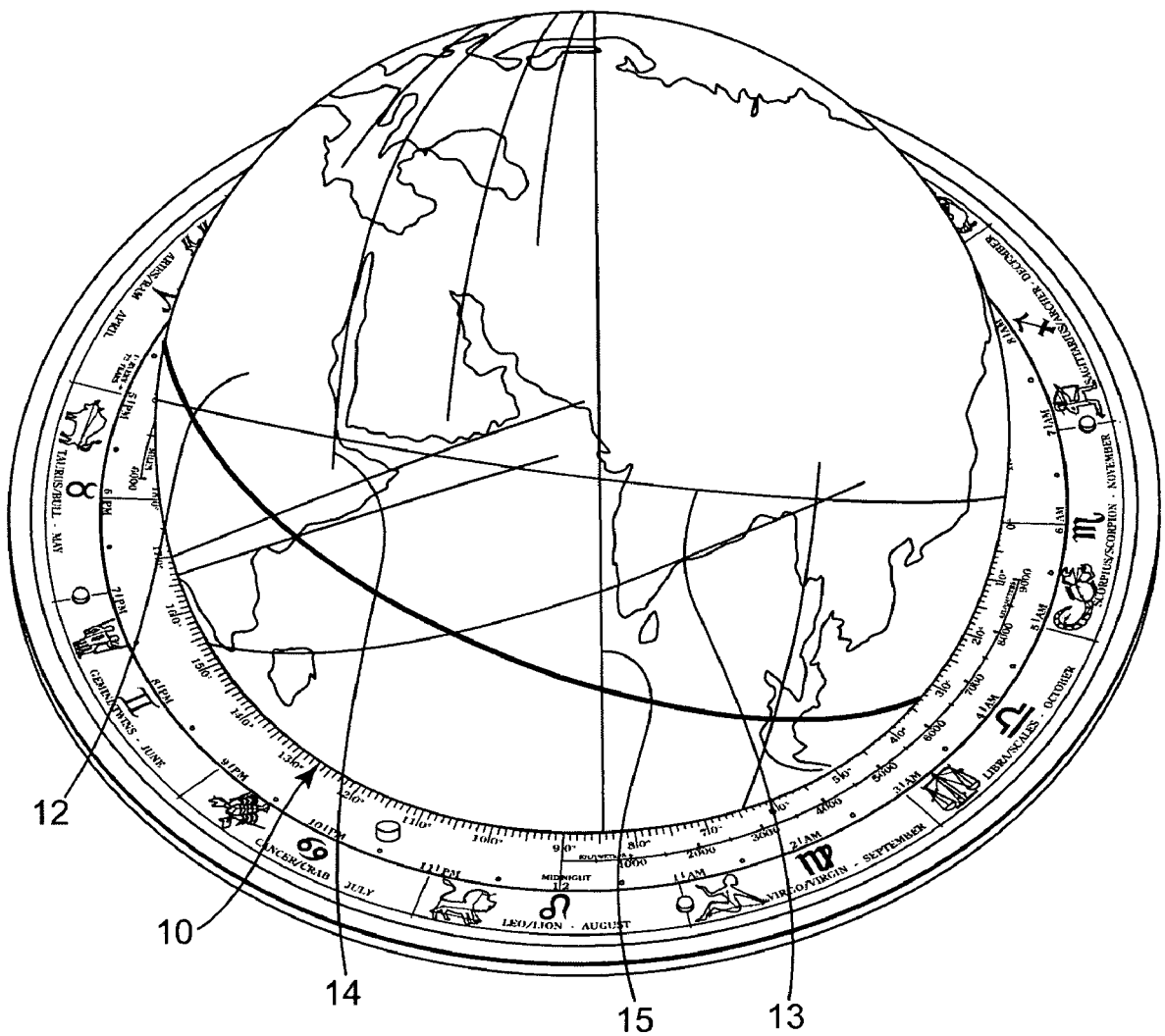
FIG. 1 is a perspective view of globe 10 having graphical image representations of a plurality of land masses and graphically marked great circle indication lines.

Turning now to the drawings, wherein like numerals indicate like parts, FIG. 1 is a perspective view of globe 10 having graphical image representations of a plurality of land masses such as Africa 12 and India 13 at locations representing the current position of the land masses on Earth. Great circle indication lines 14 and 15 are graphically marked on globe 10 generally corresponding to linear portion geographical features of land masses 12 and 13. As shown in this embodiment, the great circle indication lines are graphically marked as the complete great circle of the globe. Specifically, great circle indication line 14 is provided corresponding generally to the coast of Africa 12 at the Red Sea. Similarly, great circle indication line 15 is provided corresponding generally to the southwestern coast of India 13. Great circle indication lines 14 and 15 are seen to converge at an intersection zone on globe 10 just outside of the view of this Figure.

Figure 2:
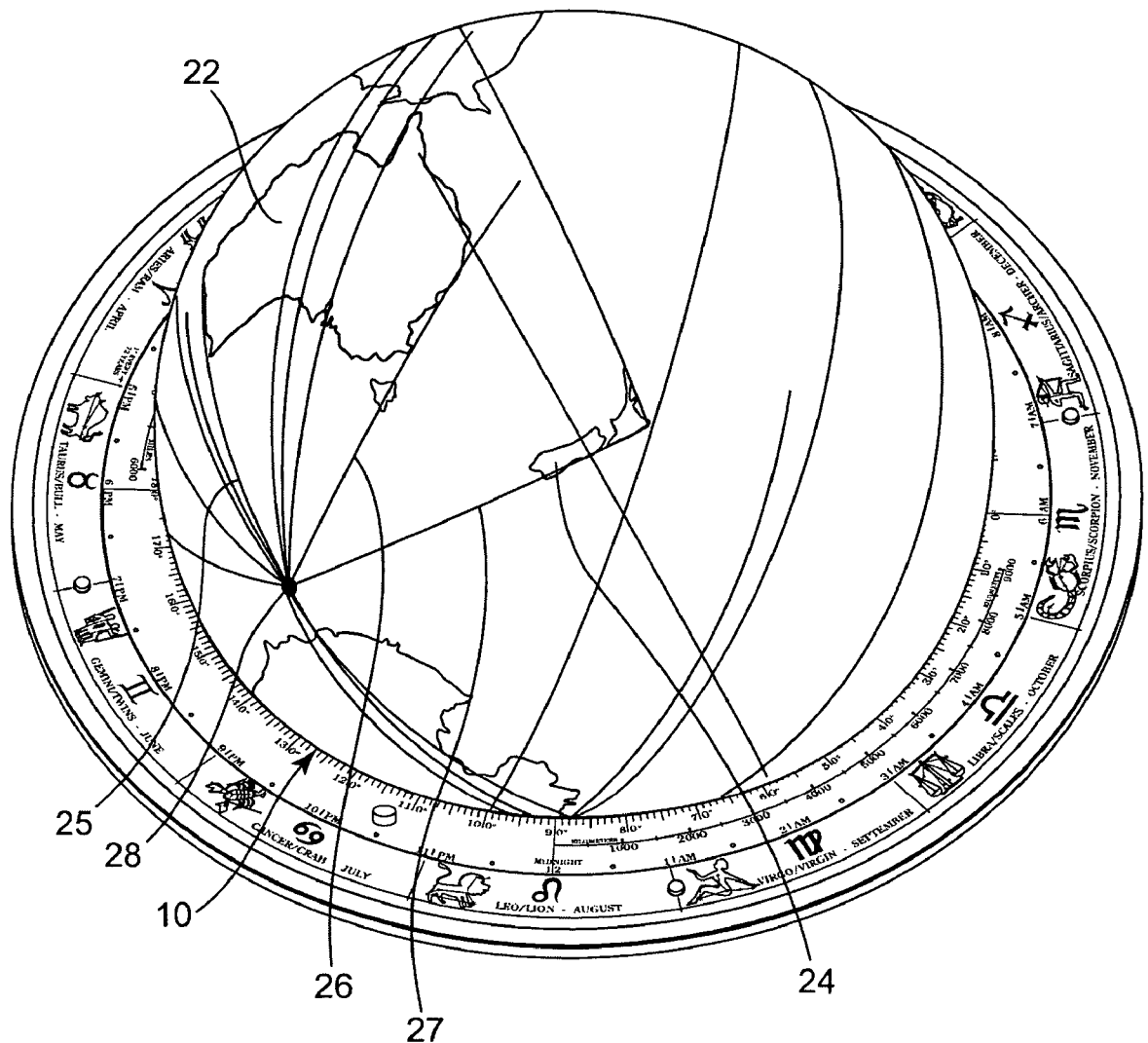
FIG. 2 is a perspective view of globe 10 from a different side, having graphical image representations of a plurality of land masses and graphically marked great circle indication lines.

FIG. 2 is a perspective view of globe 10 from a different side, having graphical image representations of a plurality of land masses such as Australia 22 and New Zealand 24. Great circle indication lines 25 and 26 correspond generally to the western and eastern coasts, respectively of Australia 22. These great circle indication lines are only graphically marked from the linear portion geographical feature to which it corresponds to the identified latitude and longitude values. Great circle indication line 27 corresponds generally to the southeast coast of New Zealand 24. Great circle indication lines 25, 26 and 27 are all seen to converge at intersection zone 28, which is located at approximately 62° south latitude and 124° east longitude.

Figure 3:
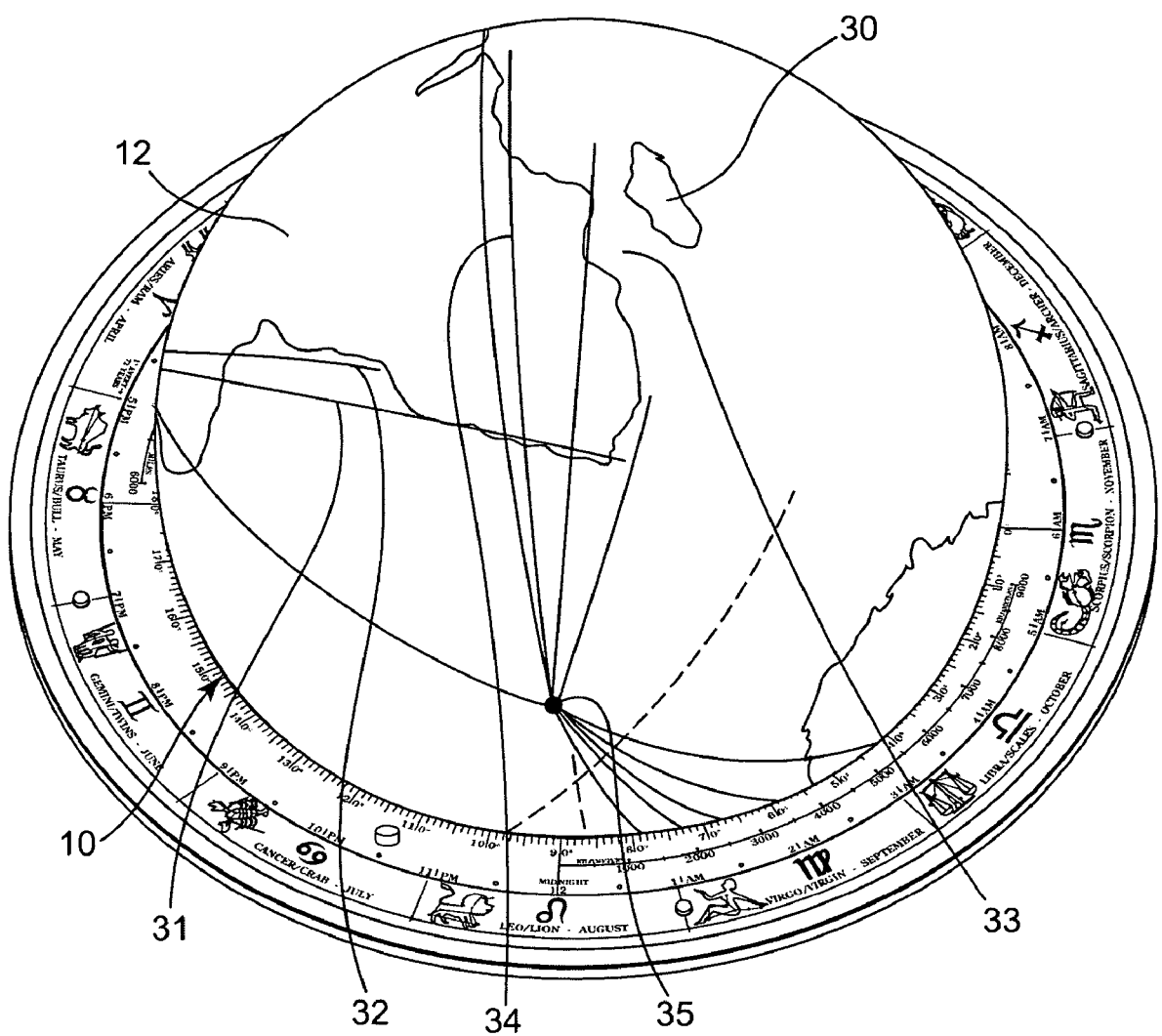
FIG. 3 is a perspective view of globe 10 from a different side, having graphical image representations of a plurality of land masses and graphically marked great circle indication lines.

FIG. 3 is a perspective view of globe 10 from a different side, having graphical image representations of a plurality of land masses, including Africa 12 and Madagascar 30. Great circle indication lines 31 and 32 correspond generally to portions of the western coast of Africa 12, are seen to converge at an intersection zone on globe 10 just outside of the view of this Figure. Great circle indication line 34 corresponds to a portion of the east coast of Africa 12, and great circle indication line 33 corresponds generally to a portion of the eastern coast of Africa 12 and the northern coast of Madagascar 30. Great circle indication lines 33 and 34, in addition to other visible great circle indication lines, are all seen to converge at intersection zone 35, which is located at approximately 43° south latitude and 13° west longitude.

Figure 4:
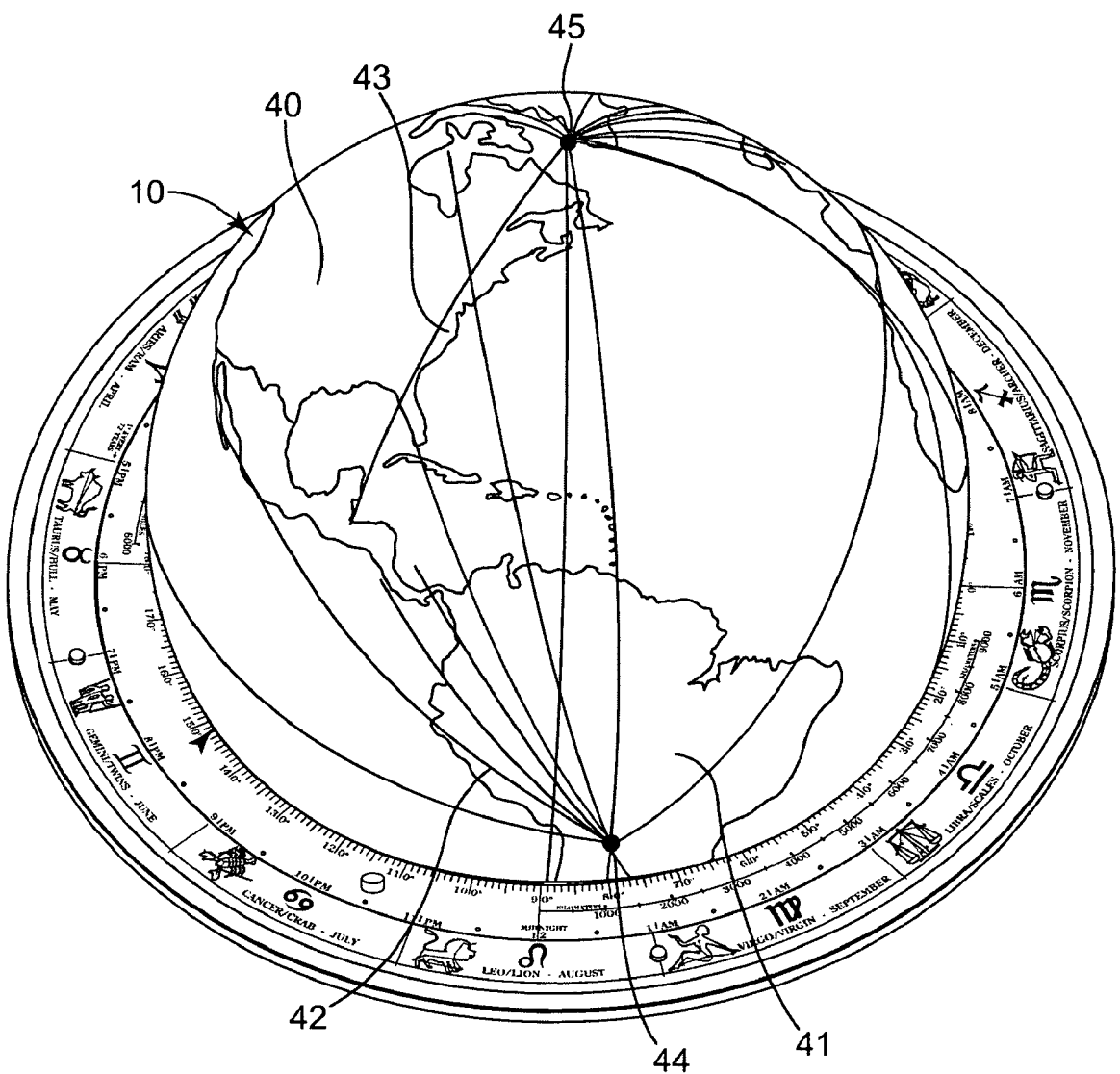
FIG. 4 is a perspective view of globe 10 from a different side, having graphical image representations of a plurality of land masses and graphically marked great circle indication lines.

FIG. 4 is a perspective view of globe 10 from a different side, having graphical image representations of a plurality of land masses, including North America 40 and South America 41. Great circle indication line 42 corresponds to a portion of the western coast of Mexico. Great circle indication line 43 corresponds to a portion of the east coast of the Yucatan Peninsula. Great circle indication line 42, in addition to other visible great circle indication lines, are all seen to converge at intersection zone 44, which is located at approximately 23.5° south latitude and 63° west longitude. Great circle indication line 43, in addition to other visible great circle indication lines, are all seen to converge at intersection zone 45, which is located at approximately 63° north latitude and 55° west longitude.

Figure 5:
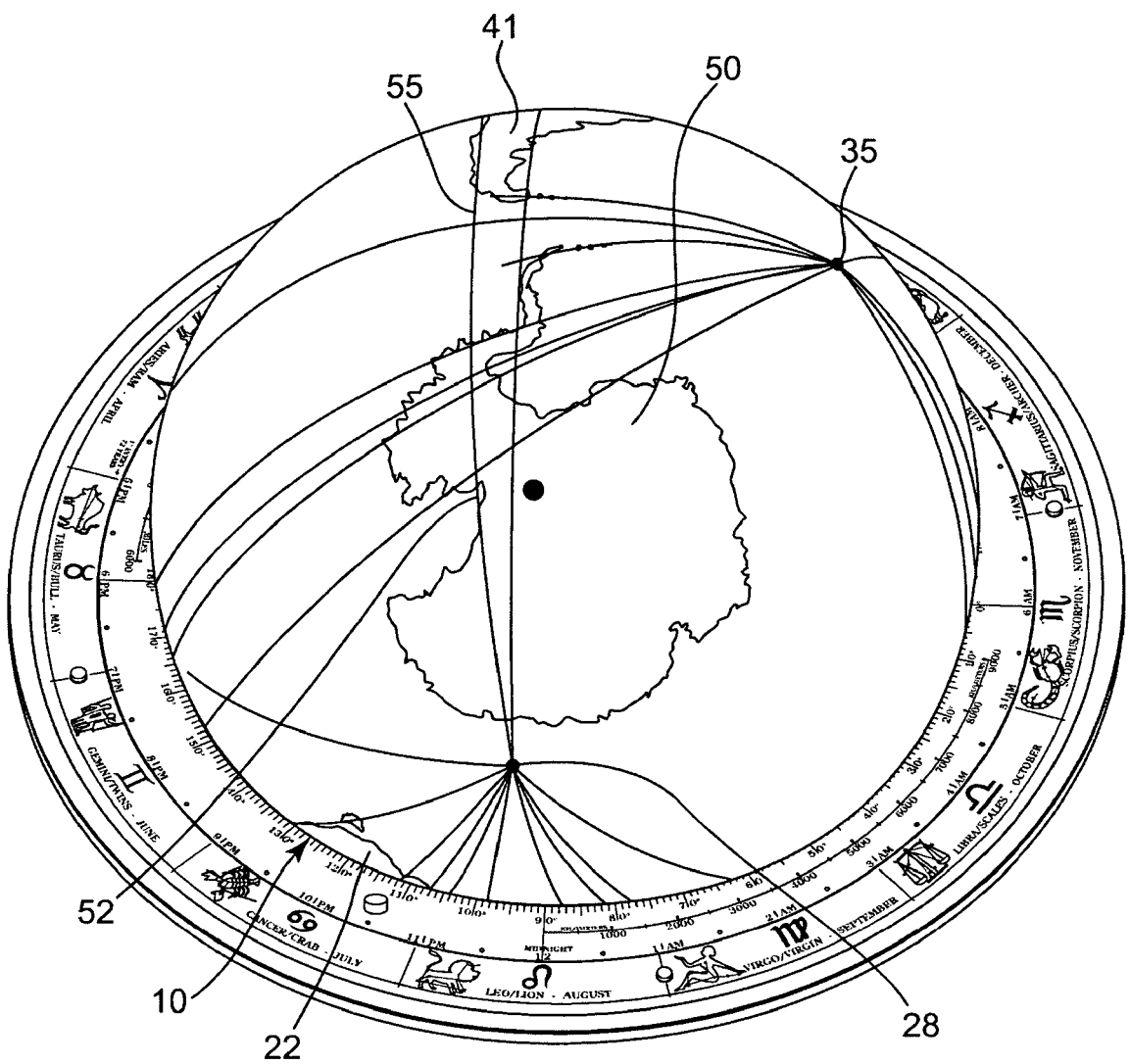
FIG. 5 is a perspective view of globe 10 from a different side, having graphical image representations of a plurality of land masses and graphically marked great circle indication lines.

FIG. 5 is a perspective view of globe 10 from a different side, having graphical image representations of a plurality of land masses, including Antarctica 50, South America 41, and Australia 22. Great circle indication line 55 corresponds to a portion of the west coast of South America 41, and together with other visible great circle indication lines, are all seen to converge at intersection zone 28, which is located at approximately 62° south latitude and 124° east longitude. This Figure illustrates in particular how a great circle indication line derived from a land mass on one side of the world identifies unique geographic positions on the other side of the globe. Similarly, visible great circle indication lines derived from land masses not visible in this view of globe 10, are all seen to converge at intersection zone 35, which is located at approximately 43° south latitude and 13° west longitude.

In another embodiment of the present invention, the globe may be provided for study purposes without including the great circle indication lines as a marked graphic representation. Such globes instead comprise only at least one graphically marked intersection zone corresponding to an area within about 5° of a geographic point having latitude and longitude values selected from the group consisting of 43° south latitude and 13° west longitude; 43° north latitude and 167° east longitude; 63° north latitude and 55° west longitude; 62° south latitude and 124° east longitude; 23.5° south latitude and 63° west longitude; and 23.5° north latitude and 120° east longitude. The graphically marked intersection zones may be so marked by intersection of complete or partial great circle indication lines, the intersection zone is graphically marked by a circle defining the area 5° around the identified latitude and longitude values, crossing marks of great circle indication lines graphically marked on the globe that are only visible within about 5° of the identified latitude and longitude values, by a single point marking in the area 5° around the identified latitude and longitude values, or the like.

In a particularly preferred embodiment, a globe is provided having one graphically marked intersection zone corresponding to an area within about 5° of a geographic point having latitude and longitude values of 63° north latitude and 55° west longitude and one graphically marked intersection zone corresponds to an area within about 5° of a geographic point having latitude and longitude values of 62° south latitude and 124° east longitude. These are particularly significant geographic points of interest, and globes having such graphically marked intersection zones are particularly helpful in advancing the understanding of geographic phenomena and theories. The graphically marked intersection zones may be so marked by intersection of complete or partial great circle indication lines, the intersection zone is graphically marked by a circle defining the area 5° around the identified latitude and longitude values, crossing marks of great circle indication lines graphically marked on the globe that are only visible within about 5° of the identified latitude and longitude values, by a single point marking in the area 5° around the identified latitude and longitude values, or the like.

A method for identifying geographic locations of interest on a globe of the Earth comprises first identifying a first major substantially linear portion of a geographical feature such as a first land mass coast, land mass shelf, island chain, or mountain chain. In general, this identification is self evident to the cartographer upon inspection of the geographical feature. Preferably, a portion of a geographical feature is substantially linear if for a length of greater than about 10°, the land mass visually corresponds to a flexible straightedge for the desired distance. More preferably, the substantially linear portion of the geographical feature has a length greater than about 20°. The analysis of the present invention can also be carried out on land mass shelf, which is a shallow extension below water of a corresponding landmass above water. Commonly, this geographical feature is described as a continental shelf. Additionally, the analysis of the present invention can be carried out using a chain of islands or mountains as a guide for identifying appropriate great circle indication lines.

Having identified a major substantially linear portion of a geographical feature, at least a portion of a first great circle is identified on the globe, wherein a portion of the great circle substantially corresponds to the linear portion of the geographical feature. The same identification process is again carried out for a major substantially linear portion of a second geographical feature, and at least a portion of a second great circle corresponding thereto. A graphic marking is made of at least one intersection zone on the globe corresponding to an intersection point of the so identified first great circle and the second great circle. Optionally, portions of the great circles are graphically marked on the globe. Alternatively, complete great circles are graphically marked on the globe. The marking process can be carried out with permanent markers, or erasable markers.

In an embodiment of the present invention, identification and/or marking of great circles on the globe can be facilitated by use of a globe assembly comprising a globe and a base cradle for the globe configured to removably and rotatably support the globe. The base cradle preferably comprises a great circle ring, wherein the great circle ring of the base cradle is used as a guide. An example of such a globe stand is described in U.S. Pat. No. 2,939,225. Another example of preferred globe and a base cradle assembly is described in U.S. patent application Ser. No. 10/985,190 filed on even date with the present application in the name of Keith Wilson, titled EARTH GLOBE ASSEMBLY, which is incorporated herein by reference.

In one embodiment of the present invention, the globe is digitally provided as a virtual image for viewing on a computer screen, television, and the like. Optionally, great circle indication lines and intersection zones may be presented in a virtual demonstration, with the globe presented absent markings, and with great circle lines and/or intersection zones added or removed as part of the virtual demonstration.

Other embodiments of this invention will be apparent to those skilled in the art upon consideration of this specification or from practice of the invention disclosed herein. All patents, patent documents, and publications cited herein are incorporated by reference as if individually incorporated. Various omissions, modifications, and changes to the principles and embodiments described herein can be made by one skilled in the art without departing from the true scope and spirit of the invention which is indicated by the following claims.

I claim:

1. A method of identifying geographic locations of interest on a globe of the Earth, comprising
   a) identifying a first major substantially linear portion of a geographical feature;
   b) identifying at least a portion of a first great circle on the globe, wherein a portion of the great circle substantially corresponds to the linear portion of a first land mass coast, land mass shelf, island chain or mountain chain;
   c) identifying a second major substantially linear portion of a second land mass coast, land mass shelf, island chain or mountain chain;
   d) identifying at least a portion of a second great circle on the globe, wherein a portion of the second great circle substantially corresponds to the linear portion of the second land mass coast, land mass shelf, island chain, or mountain chain;
   e) graphically marking at least one intersection zone on the globe corresponding to an intersection point of the first great circle and the second great circle.

2. The method of claim 1, wherein the first and second geographical features are independently selected from a land mass coast, land mass shelf, island chain, or mountain chain.

3. The method of claim 1, wherein the substantially linear portion of the first and second geographical features are substantially linear for at least about 10°.

4. The method of claim 1, wherein the substantially linear portion of the first and second geographical features are substantially linear for at least about 20°.

5. The method of claim 1, wherein the identifying at least a portion of a first great circle step b) comprises graphically marking at least a portion of the great circle on the globe, and the identifying at least a portion of a second great circle step d) comprises graphically marking at least a portion of the great circle on the globe.

6. The method of claim 1, wherein at least one graphically marked intersection zone corresponds to an area within about 5° of a geographic point having latitude and longitude values selected from the group consisting of 43° south latitude and 13° west longitude; 43° north latitude and 167° east longitude; 63° north latitude and 55° west longitude; 62° south latitude and 124° east longitude; 23.5° south latitude and 63° west longitude; and 23.5° north latitude and 120° east longitude.

7. The method of claim 1, wherein one graphically marked intersection zone corresponds to an area within about 5° of a geographic point having latitude and longitude values of 63° north latitude and 55° west longitude and one graphically marked intersection zone corresponds to an area within about 5° of a geographic point having latitude and longitude values of 62° south latitude and 124° east longitude.

8. The method of claim 1, wherein the great circles are identified using a globe assembly comprising a globe and a base cradle for the globe configured to removably and rotatably support the globe, the base cradle comprising a great circle ring, wherein the great circle ring of the base cradle is used as a guide.

* * * * *